United States Patent Office 3,363,659
Patented Jan. 16, 1968

3,363,659
STEREOSPECIFIC POLYMERS OF BUTADIENE COPOLYMERIZED WITH SMALL AMOUNTS OF A DIVINYL COMPOUND
Norman Floyd Keckler, Stow, and Bernard Lars Johnson, Akron, Ohio, assignors to The Firestone Tire & Rubber Company, Akron, Ohio, a corporation of Ohio
No Drawing. Continuation-in-part of application Ser. No. 170,836, Feb. 2, 1962, which is a continuation-in-part of application Ser. No. 133,807, Aug. 25, 1961. This application July 27, 1962, Ser. No. 213,007
10 Claims. (Cl. 152—330)

This invention relates to stereospecific polymers of butadiene modified by copolymerizing therewith small amounts of a divinyl monomer, blends thereof with rubbery polymers and pneumatic tires made therefrom.

This application is a continuation-in-part of Keckler and Johnson application, Ser. No. 170,836, filed Feb. 2, 1962, which is a continuation-in-part of Keckler and Johnson application, Ser. No. 133,807, filed Aug. 25, 1961, both of which applications are now abandoned.

This invention relates to modified, solid, rubbery, stereospecific polybutadienes, to methods for the production of such polybutadienes, and to pneumatic tires, the rubbery portions of which are fabricated partially or entirely therefrom.

Tire treads comprising the prior art stereospecific, rubbery butadienes demonstrate greater heat resistance and toughness and are significantly longer wearing than analogous tire treads manufactured from SBR or natural rubber. It is now conventional to manufacture pneumatic tires from such polybutadienes, either alone or in the form of blends with natural rubber, SBR rubber, or stereospecific polyisoprene. It is generally considered that for each 1% by weight of prior art stereospecific polybutadiene blended with natural rubber or SBR rubber, the resulting tire tread will be characterized by 1% greater treadwear. Notwithstanding the advantage of the prior art polybutadienes for tread manufacture, it is apparent that stereospecific polybutadienes of substantially improved properties would contribute substantially to the art. Moreover, prior art stereospecific polybutadienes, at normal handling temperatures, are characterized by dimensional instability manifested by significant "cold flow."

It is a primary object of this inventon to provide novel and improved stereospecific polybutadienes.

It is a primary object of this invention to provide modified, rubbery, stereospecific polybutadienes which, as compared with analogous prior art polymers, impart substantially greater wear to tire treads fabricated partially or entirely therefrom.

It is a further object of the invention to provide pneumatic tires and tire tread stocks which comprise such modified stereospecific polybutadienes.

It is another object of the invention to provide tire treads and tire tread stocks which comprise blends of such modified stereospecific polybutadienes with plastics, resins or other rubbery polymers, including natural rubber, SBR, stereospecific polyisoprenes, polybutadienes, copolymers of butadiene and ethylene-propylene copolymers.

It is an additional important object of the invention to provide a modified rubbery stereospecific polybutadiene which is resistant to cold flow.

It is a specific object of the invention to provide a modified rubbery stereospecific polybutadiene which demonstrates substantial dimensional stability throughout handling and storage periods at temperatures normally encountered in such handling and storage.

The compositions to which the invention relates comprise rubbery, stereospecific polymers containing not more than about 15% gel selected from the group consisting of (A) polymers of butadiene and a trace amount of a modifying comonomer having at least two terminal $=CH_2$ groups and (B) polymers of (1) butadiene, (2) a compound containing a terminal $=CH_2$ group, and (3) a trace amount of a modifying comonomer having at least two terminal $=CH_2$ groups.

The stereospecific polybutadiene portions of the polymers of the invention contain from at least about 30% to 100% cis 1,4 structure, a total 1,4 structure of at least about 85%, and not in excess of 12% 1,2 structure as determined by infra-red analysis. In the preferred polymers the polybutadiene portion of the polymer molecule contains not more than about 10% 1,2 structure, and a total of at least about 90% 1,4 structure. One sub-group of polymers to which the invention relates is characterized by a polybutadiene portion which contains at least about 85% cis 1,4 content and not more than about 10%, preferably 5%, 1,2 content, whereas an alternative subclass of such polymers contains from about 30% to about 60% cis 1,4 structure, at least about 85% total 1,4 structure, and not in excess of about 10% 1,2 structure, as determined by infra-red analysis.

The modified rubbery polybutadienes of this invention are produced by well known techniques utilized in the synthesis of the unmodified stereospecific rubbery polybutadienes of the prior art. Such well known techniques comprise polymerization in the presence of ionic catalysts in substantially non-aqueous, bulk or solution polymerization systems and are modified to produce the novel polybutadienes of the invention only to the extent of including an appropriate trace quantity of the modifying comonomer in the polymerization reaction system. Commercial processes for the production of such prior art polybutadienes normally utilize either Ziegler-type or lithium-based catalysts. The use of Ziegler type catalysts to produce rubbery stereospecific polybutadienes is described, inter alia, in Belgian patents 543,292; 575,671, and 551,851. The production of similar or analogous polybutadienes in the presence of lithium-based catalysts is described, inter alia, in Foster United States Patents Ser. Nos. 554,351; 544,352, and 605,440.

This invention embraces the disclosed modified stereospecific polybutadienes generically and without regard of the method or catalyst utilized in the production thereof. As the art is aware, however, at least about 90 weight percent of the stereospecific polybutadienes typically produced in the presence of Ziegler catalysts are characterized by an inherent viscosity extending over a range from about three to about four inherent viscosity units, whereas lithium-based catalysts result in stereospecific polybutadienes in which 90% of the polymer falls within a range of not more than about two inherent viscosity units. One facet of this invention resides in the discovery that the modified polybutadienes which are produced in the presence of lithium-based catalysts are characterized by an inherent viscosity range extending over a range of three to four inherent viscosity units comparable to that of the polybutadienes produced in the presence of Ziegler-type catalysts. Generally speaking, therefore, at least about 90% by weight of the modified stereospecific polybutadienes of the invention has an inherent viscosity in excess of 1 and extends over a range of at least 3 and frequently 4 inherent viscosity units.

The invention generically embraces, as modifying comonomers, all organic compounds which are characterized by two or more reactive, terminal $=CH_2$ groups. These organic compounds are effective for the purposes of the invention in their commercial grades as well as in their purified form. The modifying comonomers to which the invention relates may be either aliphatic, aromatic, cyclic, acyclic, or heterocyclic. The preferred compounds include the benzenes, xylenes, anthracenes, naphthalenes, and durenes which are substituted by two or more vinyl groups. Specifically preferred compounds include divinyl, trivinyl, and tetravinyl benzene; divinyl, trivinyl and tetravinyl ortho-, meta- and para-xylenes and divinyl, trivinyl and tetravinyl alkyl-benzenes, such as toluene, ethyl benzene, propyl benzene, ethyl, propyl benzene, and the like, which contain from one to four alkyl groups of any type having not more than about 20 and most appropriately not more than about 10 carbon atoms. The various di-, tri-, tetra-, penta-, and hexa-vinyl, substituted and unsubstituted, anthracenes, naphthalenes, and durenes are likewise specifically contemplated. Additional representative aromatic comonomer compounds include 4,4'-divinyl azobenzene, 4,4'-divinylphenylether, 4,4'-divinylphenyl sulfide, 4,4'-divinylphenyl disulfide, 4,4'-bis(vinylphenyl)amine, tris(4,4',4''-vinylphenyl)amine.

The aromatic modifying comonomers may be represented by the following general structural formula:

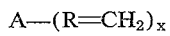

in which A represents any aromatic nucleus, such as a benzene, naphthalene, anthracene or durene ring; R represents any substituted or unsubstituted aliphatic, preferably alkyl, group containing at least one, but preferably not more than 20 carbon atoms; and $x$ is any integer from two to the number of positions available for substitution in the aromatic nucleus A. The R groups may be different in the same compound.

Aliphatic compounds which are specifically contemplated as modifying comonomers include the various acetylenes containing two or more $CH_2$ groups, specifically divinyl acetylene, diacetylene and triacetylene; diallyl acetylene, diacetylene and triacetylene; diallyl, azodiallyl, divinyl, trivinyl, diallyl and triallyl phosphates and phosphites and ethylene dimethacrylate.

It is recognized in the art that the problem of cold flow is in part a function of the inherent viscosity of the unmodified stereospecific polybutadiene in question. As the inherent viscosity of the unmodified polymer increases from the range of about 1 to 3 to the range of about 4 to 5, the cold flow problem decreases proportionately. The specific relative proportions of modifying comonomer utilized to achieve the objects of the invention as regards dimensional stability will accordingly vary to some extent upon the inherent viscosity of the analogous unmodified polybutadiene, the concentration of modifier which can be tolerated without the production of an undesirable gel content in the resulting polymer product, and the concentration of modifier requisite to impart improved treadwear to tires manufactured from the resulting modified, stereospecific, rubbery polybutadiene product. In general, it has been discovered that improvement in treadwear and dimensional stability is achieved when as little as 0.025 part by weight of modifying comonomer is utilized per 100 parts total monomer weight. In the case of unmodified butadiene polymers having an inherent viscosity in the range of from about 1.25 to about 1.3, from about 0.025 to about 0.4 part by weight of modifying comonomer per 100 parts total monomer weight, is adequate to impart dimensional stability. Preferred proportions of modifying comonomer fall within the range of about 0.05 to about 0.35 part per 100 parts total monomer weight. Normally the acceptable upper limit of not more than about 15% by weight of gel is not exceeded when the concentration of modifying comonomer is maintained within the range specified. It is important, however, when the desired treadwear properties and dimensional stability are obtained, to minimize gel content by maintaining the modifying comonomer concentration not in excess of 0.2% of the total monomer weight.

While the invention is primarily concerned with modified homopolymers of butadiene, there is embraced within the generic scope thereof modified copolymers of butadiene with all monomeric compounds having a single terminal $=CH_2$ group. Typical comonomers contemplated include vinyl monomers such as styrene, o, m, or p-methyl styrene, the various dimethyl styrenes, indene, vinyl pyridine, vinyl naphthalene, isobutene, acrylonitrile, allyl benzene, allyl toluene, allyl naphthalene, stilbene, methyl stilbene, 1,3-diphenyl-1-butene, isoprene, triphenylethylene, propylene, halogen-substituted derivatives of the foregoing and the like.

The invention generically contemplates the modification of all such copolymers in which the monomer concentrations are present in any relative proportion. The preferred modified copolymers of the invention contain from about 50% to about 99% butadiene-1,3, and from about 1% to about 50% by weight of vinyl monomer.

The modified stereospecific polybutadiene-containing polymers of the invention may be oil-extended in accordance with techniques known to the art for the oil-extension of SBR rubber. Such oil-extension techniques are described, inter alia, in U.S. Patent 2,964,083 to Pfau et al., and in Alliger applications Ser. Nos. 132,009, abandoned in favor of continuation-in-part application Ser. No. 403,-332, which was in turn abandoned in favor of pending application Ser. No. 581,423, and 132,010, abandoned in favor of continuation-in-part application Ser. No. 403,330, which is now abandoned.

The plasticizer or extension oils which can be employed in conjunction with the modified polybutadiene-containing rubbery polymers of the invention are those conventionally employed in rubber compounding and disclosed in the aforementioned Pfau et al. patent and Alliger applications. Additionally, various liquid polymers such as low molecular weight, oily, hydrocarbon polymers prepared from propylene, butadiene, styrene, isoprene, and the various chlorinated and hydroxylated derivatives thereof, may be employed. Solid plasticizers can also be used. Aromatic oils such as those known as Philrich, Shell SPX and similar commercially available products are preferred. The plasticizers are appropriately employed in amounts corresponding from about 20 to 150 parts by weight, based on 100 parts by weight of the modified polymers of the invention or blends thereof with other rubbery polymeric materials.

Conventional relative proportions of re-enforcing pigments such as the various carbon blacks or zinc oxide are utilized in the production of the oil-extended or plasticized embodiments of the rubbery polymers of the invention. The various channel blacks and furnace blacks which are characterized by different levels of abrasion resistance and processability can be employed. High abrasion furnace blacks (HAF blacks) are preferred. The carbon blacks or similar re-enforcing pigments are appropriately utilized in an amount corresponding from about 40 to about 200 parts per 100 parts by weight of the modified polybutadiene-containing polymer of the invention or the blends thereof with other rubbery polymers. In the preferred practice of the invention the carbon black is present in an amount exceeding the quantity of the plasticizer utilized. Preferably from about 1.5 to about 12 parts by weight of re-enforcing pigment per part of plasticizer is employed. For the manufacture of heavy duty tire tread stocks such as truck and bus tire treads, it is preferred to employ from about 50 to about 100 parts by weight of re-enforcing pigment such as carbon black, and from about 15 to about 100 parts, by weight, of plasticizer, based on the total quantity of rubbery polymer employed. Analogously, it is preferred to utilize from about 30 to about 100 parts by weight of reinforcing pigment such as carbon black per 100 parts by weight of combined plasticizer and rubbery polymer.

The modified polybutadiene-containing polymers of the invention are used to good advantage in the form of both two-component and multi-component blends in all relative proportions with plastics and resins as well as other rubbery polymers. Plastics and resins suitably blended with the modified polybutadiene-containing polymers of the invention include for example polystyrene, phenoplasts, aminoplasts, epoxy resins. Rubbery polymers suitably blended with the modified polybutadiene-containing polymers of the invention include for example natural rubber, SBR rubber, butadiene-acrylonitrile copolymers, stereospecific rubbery polyisoprene, conventional stereospecific polybutadienes, stereospecific butadiene copolymers and ethylene-propylene copolymers. There is preferably employed from about 25 to about 75 parts by weight of a polymer of the type contemplated by the invention and from about 25 to about 75 parts by weight of a rubbery polymer such as natural rubber, SBR, butadiene-acrylonitrile copolymers, stereospecific polyisoprene, conventional stereospecific polybutadienes, stereospecific butadiene copolymers or ethylene-propylene copolymer. Particularly desirable results are obtained from blends containing from about 60 to about 40 parts by weight of a polymer of the invention and from about 40 to about 60 parts by weight of natural rubber, ethylene-propylene copolymer, SBR, conventional stereospecific homopolymers and copolymers of butadiene or rubbery stereospecific polyisoprene.

Additionally, the modified polybutadiene-containing polymers of the invention are ideally adapted for conversion to graft polymers or copolymers. Such copolymers or graft polymers are produced by subjecting the modified polybutadienes of the invention to polymerizing conditions in the presence of one or more olefinic materials including without limitation vinyl chloride, the styrenes such as styrene, substituted styrenes, acrylonitrile, the acrylates such as methyl and ethyl acrylate, the methacrylates such as methyl and ethyl methacrylate, vinyl fluoride, and the like.

The ensuing examples demonstrate the superior properties imparted to tire treads by the polybutadiene-containing polymers of the invention and evidence the fact that such polymers are characterized by dimensional stability as determined by cold flow characteristics significantly greater than conventional stereospecific polybutadienes.

In each of the ensuing examples the flow characteristics were determined by maintaining a 1″ x 1″ x 2″ block of the rubber at a temperature of 25° C. for 24 hours. Substantial distortion of such sample cubes is indicated in the examples by the expression "flow," whereas dimensional stability as evidenced by shape retention by the sample cubes is indicated in the examples by the expression "no flow."

*Example 1*

To illustrate the improved physical properties demonstrated by the modified polybutadienes of the invention, polymers were prepared from the following charges:

|  | Parts by Weight | |
| --- | --- | --- |
| Sample No | Polymer A | Polymer B |
| Butadiene | 100 | 100 |
| Hexane | 300 | 300 |
| Butyl lithium (as carbon bound lithium) | 0.0073 | 0.0088 |
| Divinyl benzene | 0.00 | 0.1 |

Polymer A was produced in the absence of divinyl benzene and served as a control whereas Polymer B was produced in the presence of a trace amount of divinyl benzene in accordance with the invention. The control, Polymer A, had an inherent viscosity of 2.22 (and a Mooney value $ML_4$ of 38) and contained no gel. Polymer B in accordance with the invention had an inherent viscosity of 2.21 (and a Mooney value $ML_4$ of 58) and contained no gel. The two polymers were compounded in the following formulas and treads for 8.25-20 truck tires produced therefrom:

|  | Parts by Weight | |
| --- | --- | --- |
|  | Tread 1 | Tread 2 |
| SBR (extended with 37½ parts oil) | 68.75 | 68.75 |
| Polymer A (control) | 50.00 |  |
| Polymer B (of invention) |  | 50.00 |
| HAF carbon black | 60.00 | 60.00 |
| Zinc oxide | 2.00 | 2.00 |
| Stearic acid | 1.75 | 1.75 |
| Antioxidant | 0.90 | 0.90 |
| Oil | 12.25 | 12.25 |
| Sulfur | 2.00 | 2.00 |
| Accelerator | 1.00 | 1.00 |

Truck tires were built and cured embodying these treads. The tires were mounted in the dual drive position, overloaded 15 percent (load per tire of 3.830 pounds) and driven for 16,000 miles on a Texas testing track at 55 miles per hour. At the end of the tests, the tires were examined for wear, cracking and precut growth. The result of the testing was as follows:

|  | Tread 1, Control | Tread 2, Invention |
| --- | --- | --- |
| Wear rating | 100 | 120 |
| Cracking | Slight | Slight |
| Precut growth, inch | 1.88 | 1.28 |

Polymer B of the invention under the rigorous test was 20 percent better in resisting wear and 26.6 percent better in resisting cut growth than the control, Polymer A.

*Example 2*

The Polymers A and B of Example 1 were also compounded in the following formulas and 6.50-13 passenger tire treads produced therefrom:

|  | Parts by Weight | |
| --- | --- | --- |
|  | Tread 3 | Tread 4 |
| SBR (extended with 37½ pts. oil) | 68.75 | 68.75 |
| Polymer A (control) | 50.00 |  |
| Polymer B (of invention) |  | 50.00 |
| ISAF carbon black | 62.00 | 62.00 |
| Zinc oxide | 3.00 | 3.00 |
| Stearic acid | 2.00 | 2.00 |
| Oil | 18.75 | 18.75 |
| Antioxidant | 2.25 | 2.25 |
| Paraffin wax | 2.00 | 2.00 |
| Sulfur | 2.00 | 2.00 |
| Accelerator | 1.00 | 1.00 |

Passenger tires were built and cured embodying these treads. The tires were mounted on the drive wheels (rated load of 835 pounds per tire) and driven for 6,000 miles on a Texas testing track at speeds of 60 to 70 miles per hour. At the end of the test, the tires were examined for wear. The results of the tests were as follows:

|  | Tread 3, Control | Tread 4, Invention |
| --- | --- | --- |
| Wear rating | 100 | 115 |

Polymer B of the invention under the conditions of test wore 15 percent better than the control, Polymer A.

*Example 3*

This example demonstrates that the physical properties of the modified polybutadienes of the invention are comparable to the conventional stereospecific polybutadienes of the prior art, with the exception that the Mooney ($ML_4$) values are somewhat increased. The Mooney viscosity of the polymers of the invention, however, are not so high as to preclude processing on conventional factory equipment.

Polymers A (control) and B (in accordance with the invention) of Example 2 were compounded in the following tread type compound:

| | Parts by weight |
|---|---|
| Polybutadiene | 100.0 |
| ISAF carbon black | 60.0 |
| Oil | 31.0 |
| Zinc oxide | 3.0 |
| Stearic acid | 2.6 |
| Antioxidant | 2.6 |
| Sulfur | 1.8 |
| Accelerator | 0.8 |

The compounded Mooney $ML_4$ values of these stocks were 61 for the control stock and 64 for the stock containing Polymer B of the invention. These stocks both optimally cured at 212° F. in 60 minutes. Physical properties of the type normally considered in evaluating vulcanizates were determined and such properties are reported in Table I.

TABLE I

| | Control Stock | Stock of Invention |
|---|---|---|
| Normal stress-strain properties: | | |
| 300% Modulus, p.s.i. | 725 | 775 |
| Tensile, p.s.i. | 2,025 | 2,175 |
| Elongation at break, percent | 650 | 580 |
| Forced vibrator at 100° C.: | | |
| Dynamic Modulus, p.s.i. | 252 | 252 |
| Static Modulus, p.s.i. | 177 | 163 |
| Internal Friction, kilopoises | 4.9 | 5.3 |
| Ring tear, pounds/inch, at— | | |
| 212° F. | 320 | 322 |
| 275° F. | 204 | 244 |
| Firestone Flexometer: | | |
| Shore "A", cold | 59 | 59 |
| Shore "A", hot | 56 | 56 |
| Percent deflection | 20.0 | 20.0 |
| Running temperature, ° F. | 290 | 307 |
| Steel Ball Rebound, percent, at— | | |
| 73° F. | 50 | 48 |
| 212° F. | 62 | 61 |

*Example 4*

Polymerization charges, according to the following formulations, were introduced into reaction vessels:

| | Parts by Weight | | | | |
|---|---|---|---|---|---|
| Sample No | A | B | C | D | E |
| Butadiene | 100 | 100 | 100 | 100 | 100 |
| Hexane | 300 | 300 | 300 | 300 | 300 |
| Butyl lithium (as carbon bound lithium*) | 0.0121 | 0.0121 | 0.0121 | 0.0121 | 0.0121 |
| Divinyl benzene | None | 0.125 | 0.250 | 0.375 | 0.500 |

*Determined by the method of H. Gilman and A. H. Haubein, J. Am. Chem. Soc., 66, 1515-16 (1944).

Polymerization was effected, in each instance, at 50° C. Polymerizations were completed after approximately four hours and the polymer conversion was in each instance essentially 100%. The polymers were recovered from solution. In each instance inherent viscosity, percent gel content and flow charaacteristics of the resulting polymer were determined. The results of these determinations are set out in Table II as follows:

TABLE II

| Sample No | Inherent Viscosity | Percent Gel | Flow characteristics |
|---|---|---|---|
| A | 1.32 | 0.0 | Flows. |
| B | 2.14 | 0.0 | No Flow. |
| C | 3.05 | 8.5 | Do. |
| D | 2.96 | 15.0 | Do. |
| E | 2.40 | 37.0 | Do. |

As indicated in the above table, Sample A which did not contain divinyl benzene in accordance with the invention, was characterized by the cold flow to which the invention is directed. Samples B and C containing the indicated trace amounts of divinyl benzene did not flow, and further, neither of these samples contained an undue amount of gel. Although Samples D and E had their flow characteristics corrected, these samples, and particularly Sample E, contained undesirable quantities of gel.

*Example 5*

Another series of recipes according to the following formulations were charged into polymerization reactors:

| | Parts by Weight | | | |
|---|---|---|---|---|
| Sample No | A | B | C | D |
| Butadiene | 100 | 100 | 100 | 100 |
| Hexane | 300 | 300 | 300 | 300 |
| Butyl lithium (as carbon bound lithium) | 0.0097 | 0.0097 | 0.0097 | 0.0097 |
| Divinyl benzene | None | 0.10 | 0.25 | 0.50 |

Polymerization was effected, in each instance, at 50° C. Polymerizations were completed after approximately four hours and the polymer conversion was in each instance essentially 100%. The polymers were recovered from solution. In each instance inherent viscosity, percent gel content and flow characteristics of the resulting polymer were determined. The results of these determinations are set out in Table III as follows:

TABLE III

| Sample No. | Inherent Viscosity | Percent Gel | Flow Characteristics |
|---|---|---|---|
| A | 1.77 | 0.0 | Flows. |
| B | 2.26 | 0.0 | No Flow. |
| C | 3.70 | 13.8 | Do. |
| D | 2.50 | 59.3 | Do. |

Referring to the results of Table III above, it is seen that Sample A containing no divinyl benzene in accordance with the invention has the undesirable flow to which the process of the invention is directed, whereas Samples B, C and D containing trace amounts of divinyl benzene do not flow. Samples B and C, and particularly B, contain no substantial amount of undesirable gel and exemplify the invention. Sample D contains well over 50% gel and consequently is without the scope of the invention.

*Example 6*

Another series of recipes according to the following formulations were charged into polymerization reactors:

| | Parts By Weight | | | | |
|---|---|---|---|---|---|
| Sample No | A | B | C | D | E |
| Butadiene | 100 | 100 | 100 | 100 | 100 |
| Hexane | 300 | 300 | 300 | 300 | 300 |
| Butyl lithium (as carbon bound lithium) | 0.0076 | 0.0076 | 0.0076 | 0.0076 | 0.0076 |
| Divinyl benzene | 0.00 | 0.050 | 0.10 | .1875 | .375 |

Polymerization was effected, in each instance, at 50° C. Polymerizations were completed after approximately four hours and the polymer conversion was in each instance essentially 100%. The polymers were recovered from solution. In each instance inherent viscosity, percent gel content and flow characteristics of the resulting polymer were determined. The result of these determinations are set out in Table IV as follows:

TABLE IV

| Sample No. | Inherent Viscosity | Percent Gel | Flow Characteristics |
|---|---|---|---|
| A | 2.70 | 0.00 | Flows. |
| B | 2.13 | 0.00 | No Flow. |
| C | 2.77 | 0.75 | Do. |
| D | 4.09 | 1.5 | Do. |
| E | 2.91 | 65.0 | Do. |

Referring to the results of Table IV, above, Sample A containing no divinyl benzene flowed and is without the scope of the invention. Although Sample B contains a very small amount of divinyl benzene, this amount of divinyl benzene is sufficient to prevent the undesirable polymer flow to which the invention is directed. Samples C and D containing slightly more divinyl benzene also exhibit no cold flow and contain essentially no gel. Sample E containing a somewhat larger amount of divinyl benzene had 65% gel and is without the scope of the invention.

*Example 7*

Although the whole polymer inherent viscosities of such lithium catalyzed polybutadienes can be regulated substantially by varying the concentration of active catalyst, the predominant percentage of the polymer invariably falls within an inherent viscosity range of not more than three inherent viscosity units; more typically, at least about 90 percent of any such polybutadiene falls within an inherent viscosity range of one or two inherent viscosity units. Surprisingly, however, the polybutadienes of the invention have quite broad molecular weight distributions and still contain essentially no gel. These facts are illustrated by the polymers prepared pursuant to the following recipes:

| Sample No. | Parts by Weight | |
|---|---|---|
| | A, Control | B, Invention |
| Butadiene | 100 | 100 |
| Hexane | 300 | 300 |
| Butyl lithium (as carbon bound lithium) | 0.0050 | 0.00763 |
| Divinyl benzene | | 0.05 |

The polymerizations were carried out at 50° F. to 100 percent conversion. Both polymers were essentially gel free. The molecular weight distributions of the two polymers are shown in Table V as follows:

TABLE V

| | Polymer A, Control | Polymer B, Invention |
|---|---|---|
| Inherent viscosity of whole polymer | 2.0 | 2.1 |
| Acetone extract, percent | 5.1 | 1.1 |
| Percent polymer in each of following inherent viscosity ranges: | | |
| 0–1 | | 5.5 |
| 1–2 | 12 | 18.4 |
| 2–3 | 83 | 36.4 |
| 3–4 | | 23.3 |
| 4–5 | | 15.3 |

As seen from the above data, over 90 percent of the control polymer A occurred in a very narrow inherent viscosity range of no more than two and more likely one inherent viscosity unit.

What is claimed is:
1. A bend of (A) from about 75 to about 25 parts by weight of a synthetic rubbery polymer having a polybutadiene portion which contains, as determined by infrared analysis, at least 30% cis 1,4 structure, a total 1,4 structure of at least about 85% and not in excess of 12% of 1,2 structure; said polymer prepared from monomeric mixtures consisting essentially of butadiene and from about 0.025 to about 0.4 part by weight per 100 parts by weight of said butadiene, of a comonomer having at least two terminal $=CH_2$ groups, and (B) from about 25 to about 75 parts by weight of a rubbery emulsion copolymer of butadiene and styrene.

2. A blend as defined in claim 1, in which said comonomer having at least two terminal $=CH_2$ groups of said synthetic rubbery polymer has the following structural formula:

$$A\text{---}(R=CH_2)_x$$

in which A represents an aromatic nucleus, R is an aliphatic group, and $x$ is any integer from two to the number of positions available for substitution in the aromatic nucleus A.

3. A blend as defined in claim 2 in which said comonomer having at least two terminal $=CH_2$ groups of said synthetic rubbery polymer is divinyl benzene.

4. A blend as defined in claim 1 in which the polybutadiene portion of said synthetic rubbery polymer contains from about 30% to about 60% cis 1,4 structure, a total of 1,4 structure of at least 85% and not more than about 10% 1,2 structure.

5. A blend as defined in claim 1, in which the polybutadiene portion of said synthetic rubbery polymer contains at least about 85% cis 1,4 structure and not more than about 10% 1,2 structure.

6. A pneumatic tire, at least the tread portion of which comprises a vulcanizate of a blend as defined in claim 1.

7. A pneumatic tire as defined in claim 6 in which the polybutadiene portion of said vulcanizate contains from about 30% to about 60% cis 1,4 structure, a total 1,4 structure of at least about 85% and not in excess of 10% 1,2 structure.

8. A pneumatic tire as defined in claim 6 in which the polybutadiene portion of said vulcanizate contains at least about 85% cis 1,4 structure and not more than about 10% 1,2 structure.

9. A rubbery composition comprising (A) a blend, totaling 100 parts by weight, as defined in claim 1; (B) from about 40 to about 200 parts by weight of a reinforcing pigment; and (C) from about 15 to about 130 parts by weight of a plasticizer.

10. A pneumatic tire, at least the tread portion of which comprises a vulcanizate of a rubbery composition as defined in claim 9.

References Cited

UNITED STATES PATENTS

| | | | |
|---|---|---|---|
| 2,781,334 | 1/1957 | Welch et al. | 260—80.7 |
| 2,847,406 | 8/1958 | Legge | 260—83.7 |
| 2,975,160 | 3/1961 | Zelinski | 260—83.7 |
| 3,060,989 | 10/1962 | Railsback et al. | 260—5 |
| 3,084,084 | 4/1963 | D'Alelio | 260—94.3 |
| 3,094,512 | 6/1963 | Short | 260—83.7 |
| 3,239,495 | 3/1966 | Small | 260—80.7 |
| 3,280,084 | 10/1966 | Zelinski et al. | 260—83.7 |

FOREIGN PATENTS

| | | |
|---|---|---|
| 817,693 | 8/1959 | Great Britain. |
| 951,831 | 3/1964 | Great Britain. |

MURRAY TILLMAN, *Primary Examiner.*

WILLIAM H. SHORT, *Examiner.*

M. J. TULLY, J. W. SANNER, *Assistant Examiners.*